United States Patent
Liu et al.

(10) Patent No.: US 12,481,183 B2
(45) Date of Patent: Nov. 25, 2025

(54) ANTI-PEEP MODULE AND ANTI-PEEP DISPLAY DEVICE INCLUDING THE SAME

(71) Applicant: HANNSTAR DISPLAY CORPORATION, Taipei (TW)

(72) Inventors: Chia-Yu Liu, Tainan (TW); Ding-Wei Liu, Kaohsiung (TW); Shu-Chan Hsiao, Tainan (TW); Yen-Chung Chen, Taichung (TW); Cheng-Yen Yeh, Taichung (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 18/822,572

(22) Filed: Sep. 3, 2024

(65) Prior Publication Data

US 2025/0216710 A1  Jul. 3, 2025

(30) Foreign Application Priority Data

Dec. 28, 2023  (TW) .................................. 112151314

(51) Int. Cl.
*G02F 1/133*  (2006.01)
*G02F 1/13*  (2006.01)
(Continued)

(52) U.S. Cl.
CPC ........ *G02F 1/13306* (2013.01); *G02F 1/1323* (2013.01); *G02F 1/1337* (2013.01); *G02F 1/134309* (2013.01)

(58) Field of Classification Search
CPC .. G02F 1/13306; G02F 1/1323; G02F 1/1337; G02F 1/134309
See application file for complete search history.

(56) References Cited

U.S. PATENT DOCUMENTS 11,754,867 B1  9/2023  Chao
2007/0176887 A1  8/2007  Uehara
(Continued)

FOREIGN PATENT DOCUMENTS

TW  202247701 A  12/2022
TW  202343847 A  11/2023

OTHER PUBLICATIONS

EP Search Report dated Mar. 25, 2025 in European application No. 24203570.7-1001.

*Primary Examiner* — Kevin Quarterman
(74) *Attorney, Agent, or Firm* — McClure, Qualey & Rodack, LLP

(57) ABSTRACT

An anti-peep module including an anti-peep element, a driving circuit, a voltage adjustment circuit and a temperature sensor is provided. The anti-peep element includes a liquid crystal layer, a first anti-peep electrode layer and a second anti-peep electrode layer. The liquid crystal layer is located between the first and second anti-peep electrode layers. The temperature sensor is adapted to sense an ambient temperature. The voltage adjustment circuit is coupled to the temperature sensor. The driving circuit is coupled to the voltage adjustment circuit and the anti-peep element. When the ambient temperature is a first ambient temperature and the anti-peep element operates in an anti-peep mode, the driving circuit outputs a first driving voltage to the anti-peep element; when the ambient temperature is a second ambient temperature and the anti-peep element operates in the anti-peep mode, the driving circuit outputs a second driving voltage to the anti-peep element.

9 Claims, 9 Drawing Sheets

(51) Int. Cl.
    *G02F 1/1337*     (2006.01)
    *G02F 1/1343*     (2006.01)

(56) References Cited

U.S. PATENT DOCUMENTS

2020/0341312 A1\* 10/2020 Schleder .................. E06B 3/66
2020/0341313 A1\* 10/2020 Schleder .................. E06B 9/24
2022/0155631 A1    5/2022  Xin \* cited by examiner

ANTI-PEEP MODULE AND ANTI-PEEP DISPLAY DEVICE INCLUDING THE SAME

This application claims the benefit of Taiwan application Serial No. 112151314, filed Dec. 28, 2023, the subject matter of which is incorporated herein by reference.

BACKGROUND OF THE INVENTION

Field of the Invention

The invention relates in general to a display device, and more particularly to an anti-peep module and an anti-peep display device including the same.

Description of the Related Art

Today's electronic devices, such as mobile phones, tablets, laptops or automotive products, are equipped with anti-peeping products in response to privacy or driving safety requirements. Anti-peeping products can be divided into physical anti-peeping films and switchable plug-in electronic anti-peeping films. The purpose of the anti-peeping films is to prevent people from seeing the images clearly from a specific direction.

However, in a low temperature environment, the action response time of the electronic anti-peeping film will be affected. When the temperature is too low, the electronic anti-peeping film will have a problem of losing its privacy protection effect.

SUMMARY OF THE INVENTION

The invention is directed to an anti-peep module and an anti-peep display device including the same, which can adjust the driving voltage required by the anti-peep module according to the ambient temperature.

According to one aspect of the present invention, an anti-peep module including an anti-peep element, a driving circuit, a voltage adjustment circuit and a temperature sensor is provided. The anti-peep element includes a liquid crystal layer, a first anti-peep electrode layer and a second anti-peep electrode layer. The liquid crystal layer is located between the first anti-peep electrode layer and the second anti-peep electrode layer. The temperature sensor is adapted to sense an ambient temperature. The voltage adjustment circuit is coupled to the temperature sensor. The driving circuit is coupled to the voltage adjustment circuit and the anti-peep element. When the ambient temperature is a first ambient temperature and the anti-peep element operates in an anti-peep mode, the driving circuit outputs a first driving voltage to the anti-peep element; when the ambient temperature is a second ambient temperature and the anti-peep element operates in the anti-peep mode, the driving circuit outputs a second driving voltage to the anti-peep element. The first ambient temperature is greater than the second ambient temperature, and the absolute value of the first driving voltage is less than the absolute value of the second driving voltage.

According to one aspect of the present invention, an anti-peep display device including a display panel and the above-mentioned anti-peep module is provided. The anti-peep element is located on a light incident side or a light-emitting side of the display panel.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
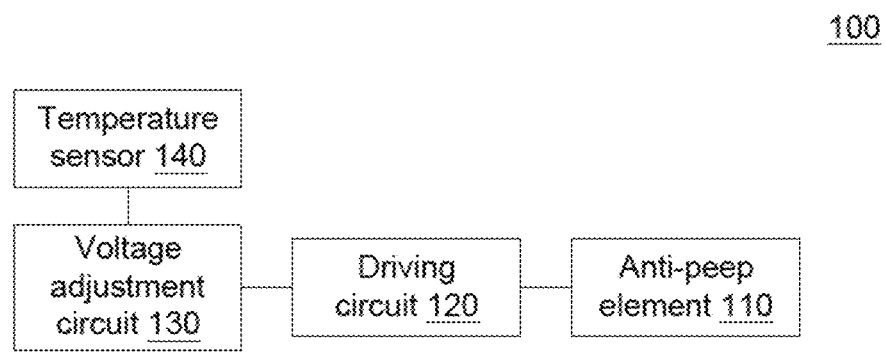
FIG. 1 is a schematic block diagram of an anti-peep module according to an embodiment of the present invention.
Figure 2:
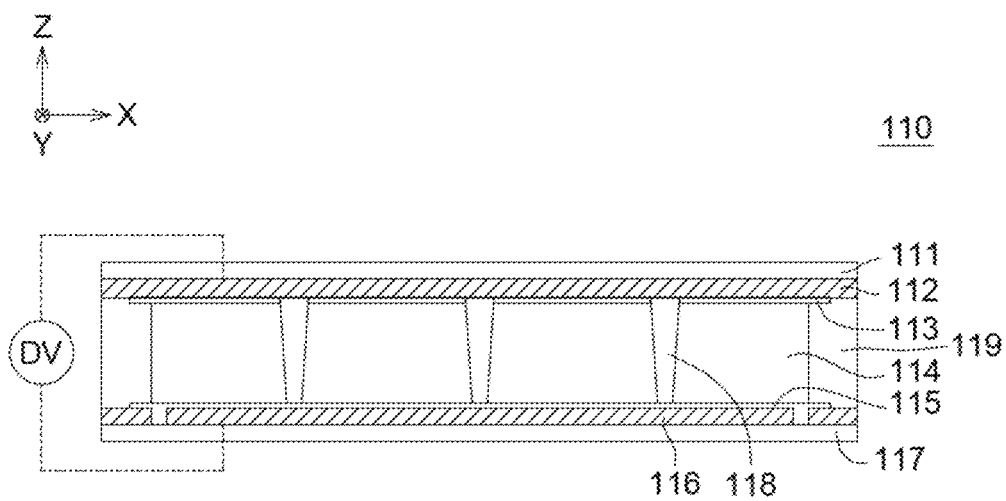
FIG. 2 is a schematic cross-sectional view of an anti-peep element according to an embodiment of the present invention.
Figure 3A:
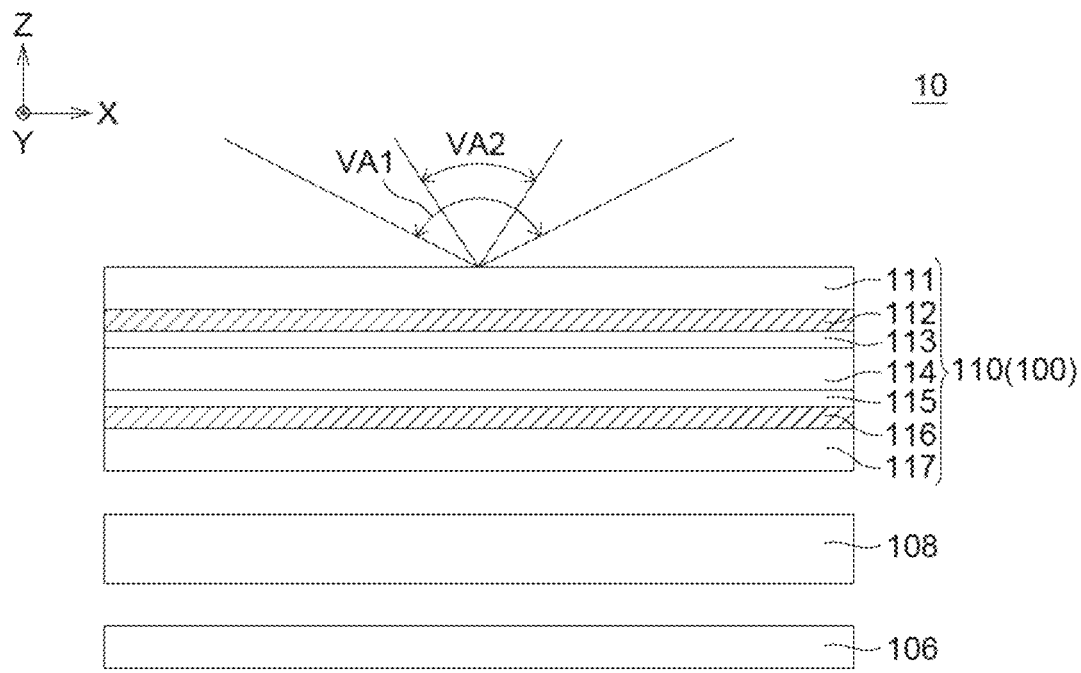
FIG. 3A is a schematic diagram of an anti-peep display device according to an embodiment of the present invention.
Figure 3B:
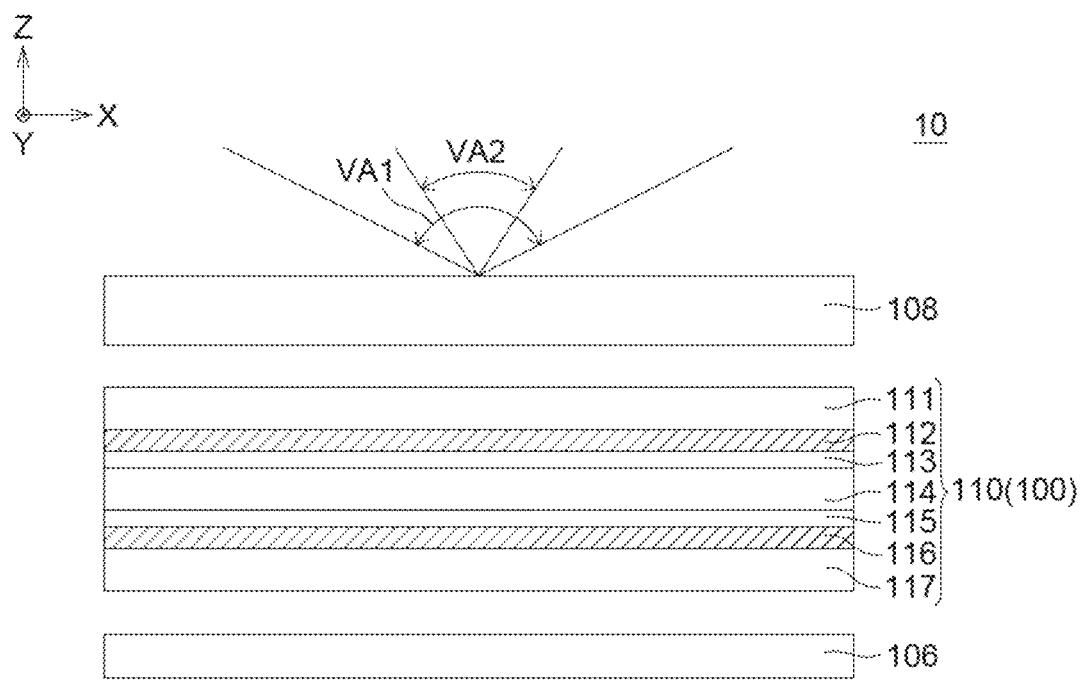
FIG. 3B is a schematic diagram of an anti-peep display device according to another embodiment of the present invention.

FIG. 1 is a schematic block diagram of an anti-peep module 100 according to an embodiment of the present invention, and FIG. 2 is a schematic cross-sectional view of an anti-peep element 110 according to an embodiment of the present invention. FIG. 3A is a schematic diagram of an anti-peep display device 10 according to an embodiment of the present invention. FIG. 3B is a schematic diagram of an anti-peep display device 10 according to another embodiment of the present invention. Refer to FIGS. 1, 2, 3A, and 3B. As shown in FIG. 1, in one embodiment, the anti-peep module 100 includes an anti-peep element 110, a driving circuit 120, a voltage adjustment circuit 130 and a temperature sensor 140. In this embodiment, the anti-peep module 100 can achieve the effect of anti-peep by changing the viewing angle of the anti-peep element 110 according to the user's needs in different usage scenarios. For example, the anti-peep element 110 can be switched between the sharing mode and the anti-peep mode. The viewing angle of the anti-peep element 110 in the sharing mode is greater than the viewing angle of the anti-peep element 110 in the anti-peep mode. In this embodiment, the anti-peep element 110 may also be called an anti-peep panel or a viewing angle control panel.

As shown in FIGS. 3A and 3B, the anti-peep display device 10 includes a display panel 108, the anti-peep module 100 and a backlight module 106. It should be noted that FIGS. 3A and 3B only illustrate the anti-peep element 110 in the anti-peep module 100, and omit the driving circuit 120, voltage adjustment circuit 130 and the temperature sensor 140 in the anti-peep module 100 in FIG. 1. The display panel 108 is used to display images, and the anti-peep element 110 is used to adjust the viewing angle of the anti-peep display device 10. When the anti-peep element 110 is in the sharing mode, the anti-peep display device 10 has a first viewing angle VA1; while when the anti-peep element 110 is in the anti-peep mode, the anti-peep display device 10 has a second viewing angle VA2. The second viewing angle VA2 is less than first viewing angle VA1. As shown in FIG. 3A, the display panel 108 is located between the backlight module 106 and the anti-peep element 110, that is, the anti-peep element 110 is located on the light-emitting side of the display panel 108. As shown in FIG. 3B, the anti-peep element 110 is located between the backlight module 106 and the display panel 108, that is, the anti-peep element 110 is located on the light incident side of the display panel 108. In the embodiments of FIGS. 3A and 3B, the display panel 108 may be a non-self-luminous display panel, such as a liquid crystal display panel. In addition, in a modified embodiment of FIG. 3A, the anti-peep display device 10 may not include the backlight module 106, and the display panel 108 may be a self-luminous display panel, such as a light-emitting diode display panel.

As shown in FIG. 2, the anti-peep element 110 includes a first substrate 111, a first anti-peep electrode layer 112, a first alignment layer 113, a liquid crystal layer 114, a second alignment layer 115, a second anti-peep electrode layer 116, a second substrate 117, a spacer 118 and a sealant 119. The liquid crystal layer 114 includes a plurality of liquid crystal molecules (not shown). In some embodiments, the anti-peep element 110 further includes at least one polarizer (not shown). For example, the anti-peep element 110 may further include two polarizers, respectively located on the side of the first substrate 111 facing away from the liquid crystal layer 114 and on the side of the second substrate 117 facing away from the liquid crystal layer 114. The liquid crystal layer 114 is located between the first anti-peep electrode layer 112 and the second anti-peep electrode layer 116, the first alignment layer 113 is located between the first anti-peep electrode layer 112 and the liquid crystal layer 114, and the second alignment layer 115 is located between the anti-peep electrode layer 116 and the liquid crystal layer 114, the first anti-peep electrode layer 112 is located between the first alignment layer 113 and the first substrate 111, and the second anti-peep electrode layer 116 is located between the second alignment layer 115 and the second substrate 117. The first anti-peep electrode layer 112 and the second anti-peep electrode layer 116 are light-transmitting electrode layers, so that light can penetrate the anti-peep element 110. The material of the first anti-peep electrode layer 112 and the second anti-peep electrode layer 116 may be a transparent conductive material, such as but not limited to indium tin oxide (ITO) or indium zinc oxide (IZO). The sealant 119 is used to join the first substrate 111 and the second substrate 117 so that the liquid crystal layer 114 is located in the space formed by the first substrate 111, the second substrate 117 and the sealant 119. That is, the anti-peep element 110 is a liquid crystal cell. The spacer 118 is located between the first substrate 111 and the second substrate 117 and is used to maintain the height of the cell gap of the liquid crystal cell.

The driving circuit 120 is electrically connected to the first anti-peep electrode layer 112 and the second anti-peep electrode layer 116 of the anti-peep element 110 to provide a driving voltage DV (or called the voltage applied to the liquid crystal layer 114, which is the voltage difference between the first anti-peep electrode layer 112 and the second anti-peep electrode layer 116) required for the anti-peep element 110, so that the liquid crystal molecules in the liquid crystal layer 114 rotate to a predetermined angle. When the anti-peep element 110 is in the anti-peep mode, the driving circuit 120 provides a first voltage and a second voltage to the first anti-peep electrode layer 112 and the second anti-peep electrode layer 116 respectively, the difference between the first voltage and the second voltage (i.e., the voltage difference between the first voltage and the second voltage) is the driving voltage DV, and the driving voltage DV is not equal to 0. In addition, in the sharing mode, the driving voltage DV is equal to 0, or the driving voltage DV is not applied (at least one of the first anti-peep electrode layer 112 and the second anti-peep electrode layer 116 is floating). Therefore, the anti-peep module 100 can change the rotation angle of the liquid crystal molecules through the driving voltage DV, so that the anti-peep element 110 switches between the anti-peep mode and the sharing mode.

The voltage adjustment circuit 130 is electrically connected to the temperature sensor 140 and the driving circuit 120. The temperature sensor 140 is used to sense an ambient temperature, and when the ambient temperature changes, the voltage adjustment circuit 130 correspondingly adjusts the driving voltage DV output by the driving circuit 120. Specifically, the temperature sensor 140 may include a temperature sensing element. When the ambient temperature changes, the characteristics of the temperature sensing element change (such as, but not limited to, the resistance, current or voltage of the temperature sensing element changes), thereby causing the temperature sensor 140 to measure the ambient temperature or the characteristics of the temperature sensor 140 to be changed corresponding to a change of the ambient temperature, and the voltage adjustment circuit 130 can dynamically adjust the value of the driving voltage DV output by the driving circuit 120 according to the ambient temperature measured by the temperature sensor 140 or the change of the characteristics of the temperature sensor 140. That is, when the ambient temperature changes, the voltage adjustment circuit 130 can compensate the driving voltage DV (that is, adjust the value of the driving voltage DV correspondingly at different ambient temperatures). In this embodiment, when the ambient temperature is a first ambient temperature and the anti-peep element 110 operates in the anti-peep mode, the driving circuit 120 outputs a first driving voltage to the anti-peep element 110; when the ambient temperature is a second ambient temperature and the anti-peep element 110 operates in the anti-peep mode, the driving circuit 120 outputs a second driving voltage to the anti-peep element 110. The first ambient temperature is greater than the second ambient temperature, and the absolute value of the first driving voltage is less than the absolute value of the second driving voltage.

Figure 4A:
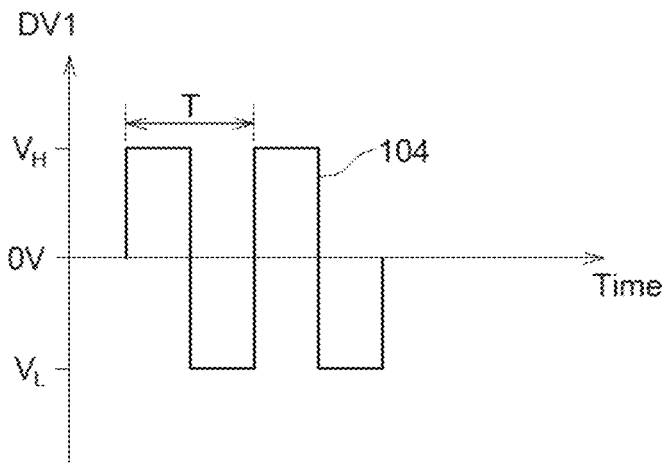
FIG. 4A is a waveform diagram of the first driving voltage of the anti-peep element according to an embodiment of the present invention.
Figure 4B:
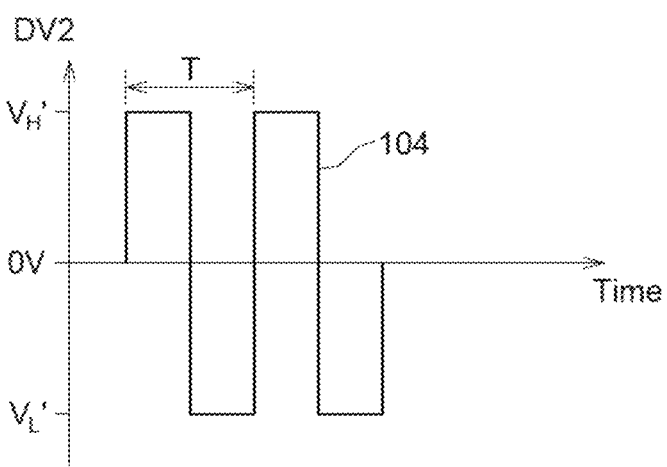
FIG. 4B is a waveform diagram of the second driving voltage of the anti-peep element according to an embodiment of the present invention.

FIG. 4A is a waveform diagram of the first driving voltage of the anti-peep element 110 according to an embodiment of the present invention. FIG. 4B is a waveform diagram of the second driving voltage of the anti-peep element 110 according to an embodiment of the present invention. Refer to FIGS. 2, 4A, and 4B. In this embodiment, the first and second driving voltages DV1 and DV2 may be AC signals to avoid polarization of the liquid crystal molecules of the anti-peep element 110. As shown in FIG. 4A, the first driving voltage DV1 of the anti-peep element 110 is an AC signal (expressed as a square wave). The driving voltage DV1 within a part and the remaining part of a period T of the AC signal (for example, half and the remaining half of a period T) are VH and VL respectively. VH is greater than 0V (volts), and VL is less than 0V. In this embodiment, VH and VL may also be referred to as a first positive driving voltage and a first negative driving voltage respectively. As shown in FIG. 4B, the second driving voltage DV2 of the anti-peep element 110 within a part and the remaining part of a period T of the AC signal (for example, half and the remaining half of the period T) are VH' and VL' respectively. VH' is greater than 0V, and VL' is less than 0V. In this embodiment, VH' and VL' may also be referred to as a second driving positive voltage and a second driving negative voltage respectively. The difference between FIG. 4A and FIG. 4B is that VH' is larger than VH, and VL' is smaller than VL, that is, the absolute value of the first driving voltage DV1 is smaller than the absolute value of the second driving voltage DV2. For example, VH and VL can be +4.76V and −4.76V respectively, and VH' and VL' can be +7.56V and −7.56V respectively. In FIGS. 4A and 4B, the first driving voltage DV1 is VH and VL (or the second driving voltage DV2 is VH' and VL') respectively during half and the remaining half of the period T of the AC signal, but it is not limited. The duty ratio of VH and VL (or VH' and VL') within the period T can be adjusted according to actual needs.

Figure 5:
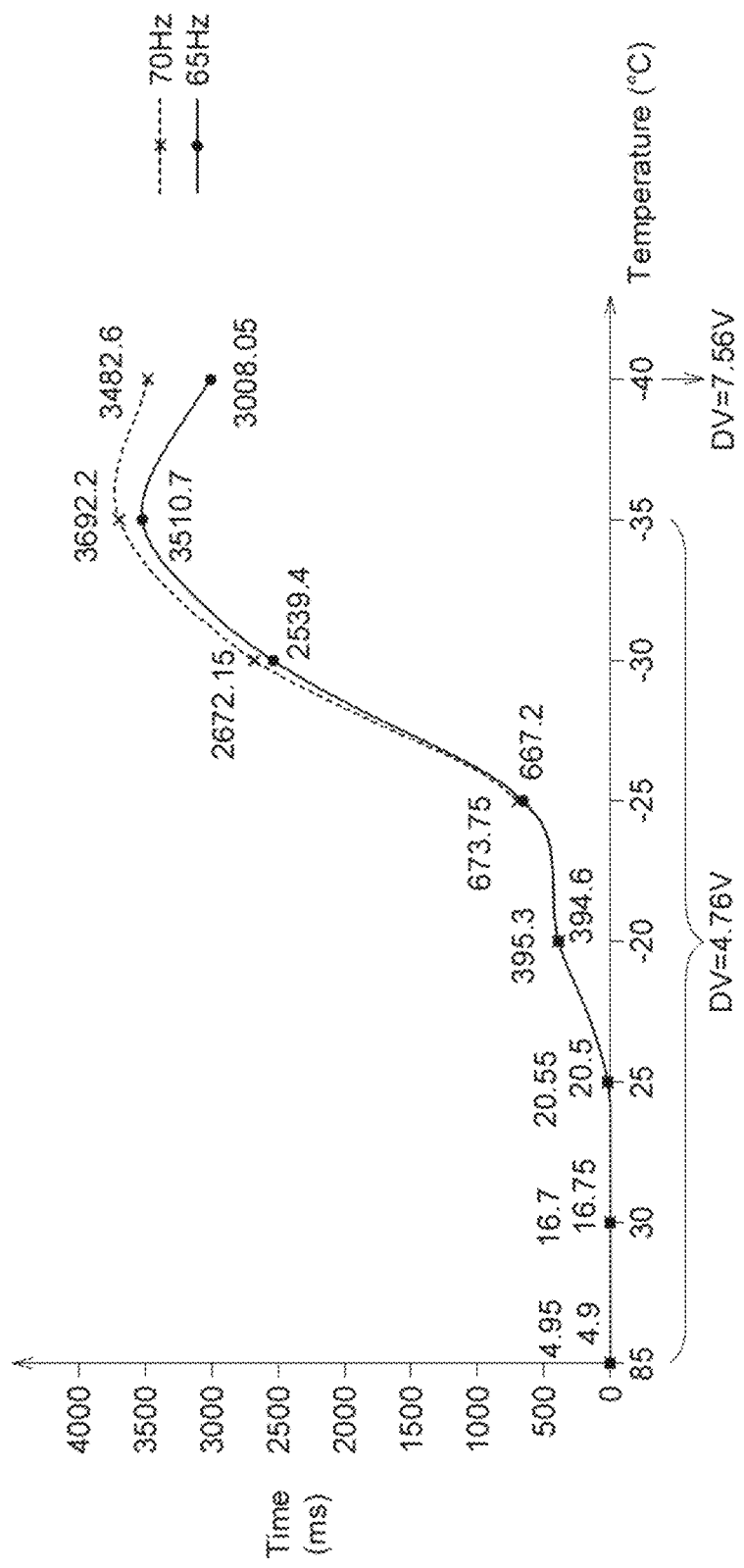
FIG. 5 is a diagram illustrating the relationship between ambient temperatures and response times of liquid crystal molecules of the anti-peep element according to an embodiment of the present invention.

FIG. 5 is a diagram illustrating the relationship between the ambient temperature and the response time of the liquid crystal molecules of the anti-peep element 110 according to an embodiment of the present invention. Refer to FIG. 5. The horizontal axis in FIG. 5 is the ambient temperature, and the vertical axis is the response time of the liquid crystal molecules. The 65 Hz line segment in FIG. 5 represents the relationship between the ambient temperature and the response time of the liquid crystal molecules of the anti-peep element 110 when the frequency of the driving voltage DV is 65 Hz, while the 70 Hz line segment represents the relationship between the ambient temperature and the response time of the liquid crystal molecules of the anti-peep element 110 when the frequency of the driving voltage DV is 70 Hz. The mark 4.76V in FIG. 5 means that the absolute value of the driving voltage DV is 4.76V in the ambient temperature range from 85° C. to −35° C. (for example, the driving voltage DV is the first driving voltage DV1 in FIG. 4A); and the mark 7.56V in FIG. 5 means that the absolute value of the driving voltage DV is 7.56V when the ambient temperature is −40° C. (for example, the driving voltage DV is the second driving voltage DV2 in FIG. 4B). As shown in FIG. 5, when the ambient temperature is lower than 25° C., the response time of the liquid crystal molecules begins to increase. Especially when the ambient temperature is in a range of −25° C. to −35° C., the response time of the liquid crystal molecules increases sharply (increase about 548%), even when the ambient temperature is −40° C., the response time of the liquid crystal molecules cannot be measured. That is, when the ambient temperature drops, the liquid crystal phase of the liquid crystal layer 114 gradually tends to the solid state (crystalline state), so that the response time increases, even when the ambient temperature is −40° C., the rotations of the liquid crystal molecules of the anti-peep element 110 corresponding to 4.76V driving voltage are abnormal, causing the anti-peep mode of the anti-peep element 110 to fail. Therefore, when the ambient temperature is −40° C., the absolute value of the driving voltage DV is increased to 7.56V, and the response time of the liquid crystal molecules decreases, making the anti-peep mode of the anti-peep element 110 normal.

Table 1 shows the measurement of the luminance value and the BR value at polar angle=0° and azimuth angle=270° at different ambient temperatures and driving voltages DV when the anti-peep element 110 is in the anti-peep mode, wherein the frequency of the driving voltage DV is 70 Hz. Table 2 shows the measurement of the luminance value and the BR value at polar angle=35° and azimuth angle=270° at different ambient temperatures and driving voltages DV when the anti-peep element 110 is in the anti-peep mode, wherein the frequency of the driving voltage DV is 70 Hz. The BR (Brightness Ratio) value in Table 1 is the ratio of the luminance measured at polar angle=0° and azimuth angle=270° in the anti-peep mode and the luminance measured at polar angle=0° and azimuth angle=270° in the sharing mode. The BR value in Table 2 is the ratio of the luminance measured at polar angle=35° and azimuth angle=270° in the anti-peep mode and the luminance measured at polar angle=35° and azimuth angle=270° in the sharing mode. Referring to FIG. 2, an included angle between a direction in which the luminance value and the BR value are measured and a normal direction (i.e., direction Z) of the XY plane (i.e., the plane formed in the directions X and Y) is the polar angle. Therefore, the luminance value and the BR value measured at the polar angle=0° represent the luminance value and the BR value measured from the front of the anti-peep element 110, and the luminance value and the BR value measured at the polar angle=35° represent the luminance value and the BR value measured in a direction oblique to the anti-peep element 110. As shown in Table 1, when the anti-peep element 110 is in the anti-peep mode and the ambient temperature drops to −40° C., the driving voltage DV needs to be increased to 7.1V so that the luminance value and the BR value at the front of the anti-peep element 110 (i.e., the polar angle=) 0° can be maintained at greater than 4900 and 99% respectively, that is, an image displayed by the anti-peep display device 10 (i.e., the image displayed by the display panel 108 of the anti-peep display device 10) is visible to a viewer located at the front of the anti-peep display device 10. As shown in Table 2, when the anti-peep element 110 is in the anti-peep mode and the ambient temperature drops to −40° C., the driving voltage DV needs to be increased to 7.3V so that the brightness value and the BR value measured in the direction oblique to the anti-peep element 110 (i.e., the polar angle=) 35° can be reduced to less than 45 and 3.5% respectively, that is, the image displayed by the anti-peep display device 10 is invisible to a viewer located obliquely to the anti-peep display device 10. To sum up, when the ambient temperature drops to −40° C., the driving voltage DV is preferably greater than 7.3V (for example, 7.56V), so that when the anti-peep element 110 is in the anti-peep mode, the image displayed by the anti-peep display device 10 is visible when viewed from a front direction and is invisible when viewed from an oblique direction.

TABLE 1

| Ambient temperature | Driving voltage (DV) | Polar angle = 0° Azimuth angle = 270° | |
|---|---|---|---|
| | | Luminance value | BR value |
| 85° C. | 4 V | 4917.55 | 99.24% |
| 30° C. | 4.4 V | 5090.05 | 99.23% |
| 25° C. | 4.4 V | 5091.55 | 99.19% |
| −20° C. | 4.8 V | 5019.25 | 98.97% |
| −30° C. | 5.0 V | 5005.25 | 98.93% |
| −40° C. | 7.1 V | 4990.05 | 99.06% |

TABLE 2

| Ambient temperature | Driving voltage (DV) | Polar angle = 35° Azimuth angle = 270° | |
|---|---|---|---|
| | | Luminance value | BR value |
| 85° C. | 4.2 V | 84.17 | 7.21% |
| 30° C. | 4.9 V | 44.46 | 3.66% |
| 25° C. | 4.9 V | 43.09 | 3.54% |
| −20° C. | 5.1 V | 37.95 | 3.11% |
| −30° C. | 5.3 V | 37.74 | 3.10% |
| −40° C. | 7.3 V | 42.10 | 3.47% |

Table 3 shows the absolute values of the driving voltages of the anti-peep element 110 in the sharing mode and the anti-peep mode at different ambient temperatures. As shown in Table 3, when the anti-peep element 110 is in the sharing mode, the absolute value of the driving voltage DV is 0V when the ambient temperature is in a range of 85° C. to −40° C.; when the anti-peep element 110 is in the anti-peep mode, the absolute value of the driving voltage DV is 4.76V at an ambient temperature in a range of 85° C. to −35° C., while the absolute value of the driving voltage DV is increased to 7.56V at an ambient temperature of −40° C. to avoid the anti-peep mode of the anti-peep element 110 fails at low temperatures. To sum up, when the anti-peep element 110 is in the anti-peep mode, the voltage adjustment circuit 130 can dynamically adjust the driving voltage DV output by the driving circuit 120 at different ambient temperatures. When the ambient temperature is the first ambient temperature (for example, When the ambient temperature is any temperature in the range of 85° C. to −35° C.), the drive circuit 120 outputs a first driving voltage (for example, 4.76V); when the ambient temperature is the second ambient temperature (for example, −40° C.), the drive circuit 120 outputs the second driving voltage (for example, 7.56V), wherein the first ambient temperature is greater than the second ambient temperature, and the absolute value of the first driving voltage is less than the absolute value of the second driving voltage.

TABLE 3

| | Ambient temperature in the range of 85° C. to −35° C. | Ambient temperature of −40° C. |
|---|---|---|
| Sharing mode | 0 V | 0 V |
| Anti-peep mode | 4.76 V | 7.56 V |

The above-mentioned embodiment is illustrated based on the driving voltage being 4.76V when the ambient temperature is in the range of 85° C. to −35° C. and the driving voltage being 7.56V when the ambient temperature is −40° C., but the present invention is not limited thereto. The temperature range in which the driving voltage DV needs to be increased and the adjustment ratio of the driving voltage DV can be designed based on the structure of the anti-peep element 110 and the characteristics of the liquid crystal molecules. For example, in some embodiments, when the anti-peep element 110 is in the anti-peep mode, the voltage adjustment circuit 130 can dynamically adjust the driving voltage DV output by the driving circuit 120 at different ambient temperatures, wherein when the ambient temperature is a first ambient temperature, the drive circuit 120 outputs a first driving voltage; when the ambient temperature is a second ambient temperature, the drive circuit 120 outputs a second driving voltage, the first ambient temperature is, for example, greater than or equal to 0° C., the second ambient temperature is, for example, less than 0° C., the absolute value of the second driving voltage may be 1.4 to 2 times the absolute value of the first driving voltage. For example, the absolute value of the first driving voltage may be 4 to 5V, and the absolute value of the second driving voltage can be 7 to 8V.

Figure 6A:
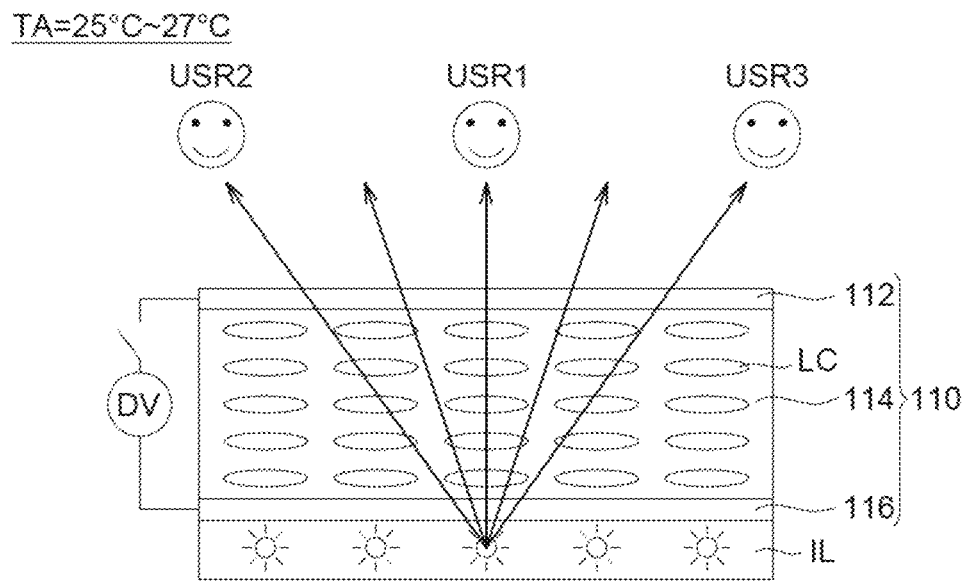
FIG. 6A is a schematic diagram of the anti-peep element in the sharing mode when the ambient temperature is from 25° C. to 27° C. according to an embodiment of the present invention.
Figure 6B:
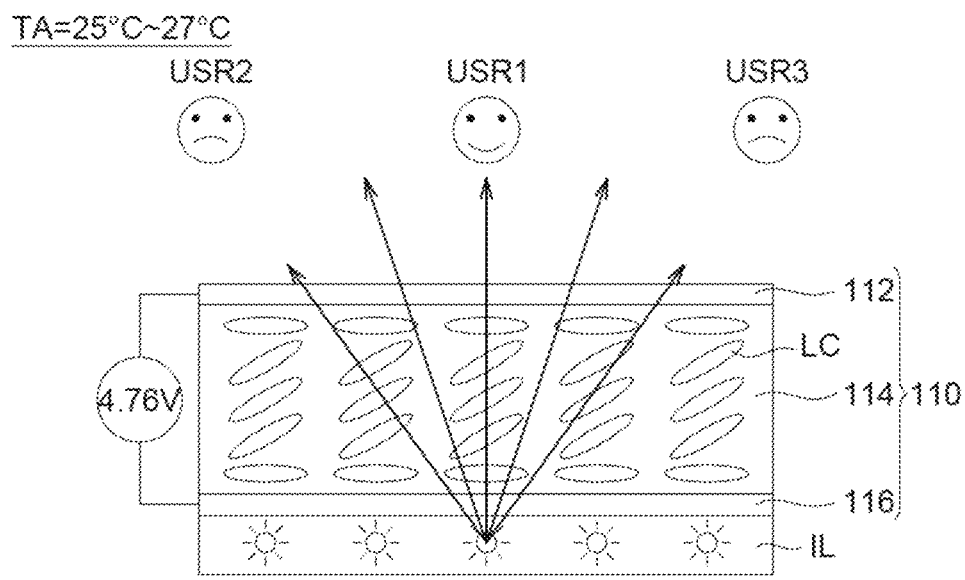
FIG. 6B is a schematic diagram of the anti-peep element in the anti-peep mode when the ambient temperature is from 25° C. to 27° C. according to an embodiment of the present invention.

FIG. 6A illustrates a schematic diagram of the anti-peep element 110 in the sharing mode when the ambient temperature TA is in a range of 25° C. to 27° C. according to an embodiment of the present invention. FIG. 6B illustrates a schematic diagram of the anti-peep element 110 in the anti-peep mode when the ambient temperature is in a range of 25° C. to 27° C. according to an embodiment of the present invention. In FIGS. 6A and 6B and the following FIGS. 7A, 7B and 7C, in order to simplify the drawings, the anti-peep element 110 only shows the first anti-peep electrode layer 112, the liquid crystal layer 114 and the second anti-peep electrode layer 116, and the polarizer and the first substrate 111, the first alignment layer 113, the second alignment layer 115, the second substrate 117, the spacers 118 and the sealant 119 in FIG. 2 are omitted. As shown in FIG. 6A, when the driving voltage DV is 0V, or when at least one of the first anti-peep electrode layer 112 and the second anti-peep electrode layer 116 is floating, the anti-peep element 110 is in the sharing mode. At least most of the incident light IL located on the light incident side of the anti-peep element 110 will penetrate the anti-peep element 110 and be emitted from the anti-peep element 110 to form light having a wide angle range, so that the viewer USR1 located at the front of the anti-peep element 110 and the viewers USR2 and USR3 located obliquely to the anti-peep element 110 can see the images displayed by the anti-peep display device. It should be noted that, FIGS. 6A and 6B and the following FIGS. 7A, 7B and 7C omit the display panel of the anti-peep display device. The display panel may be located between the anti-peep element 110 and the viewers USR1, USR2 and USR3 (for example, refer to FIG. 3B), or the anti-peep element 110 may be located between the display panel and the viewers USR1, USR2 and USR3 (for example, refer to FIG. 3A). As shown in FIG. 6B, when the driving voltage DV is 4.76V, the anti-peep element 110 is in the anti-peep mode, and the electric field between the first anti-peep electrode layer 112 and the second anti-peep electrode layer 116 will drive the liquid crystal molecules LC of the liquid crystal layer 114 to rotate and changes the angle of the liquid crystal molecules LC. Therefore, when the incident light IL passes through the liquid crystal layer 114, it will be affected by the liquid crystal molecules LC and change the polarization state, so that a part of the incident light IL located on the light incident side of the anti-peep element 110 will penetrate the anti-peep element 110 and be emitted from the anti-peep element 110 to form light having a narrow angle range, so that the viewer USR1 can see the images, but the viewers USR2 and USR3 cannot see the images clearly. In FIGS. 6A and 6B and in the following FIGS. 7A, 7B and 7C, the incident light IL can be the light output by the display panel (for example, in the embodiment of FIG. 3A, the display panel 108 is located at the light incident side of the anti-peep element 110, and the light output by the display panel 108 is the incident light IL of the anti-peep element 110) or the light generated by the backlight module (for example, in the embodiment of FIG. 3B, the backlight module 106 and the display panel 108 are respectively located at the light incident side and the light emitting side of the anti-peep element 110, and the light generated by the backlight module 106 is the incident light IL of the anti-peep element 110).

Figure 7A:
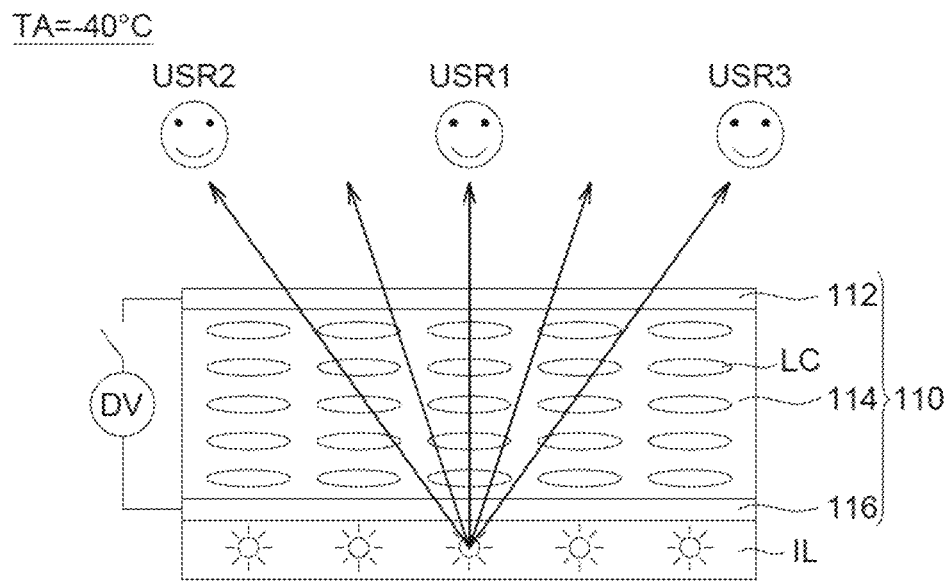
FIG. 7A is a schematic diagram of the anti-peep element in the sharing mode when the ambient temperature is −40° C. according to an embodiment of the present invention.
Figure 7B:
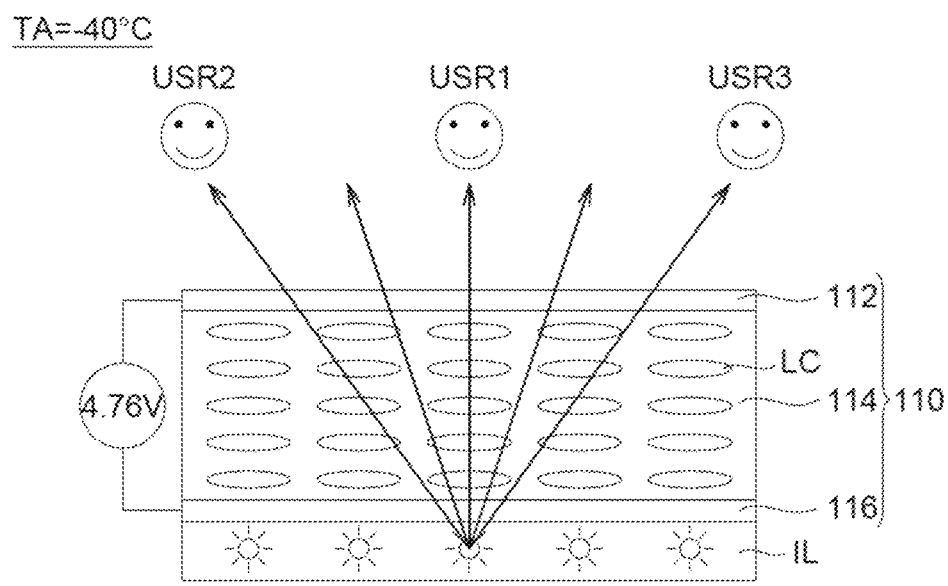
FIG. 7B is a schematic diagram illustrating the failure of the privacy mode of the anti-peep element when the ambient temperature is −40° C. according to an embodiment of the present invention.
Figure 7C:
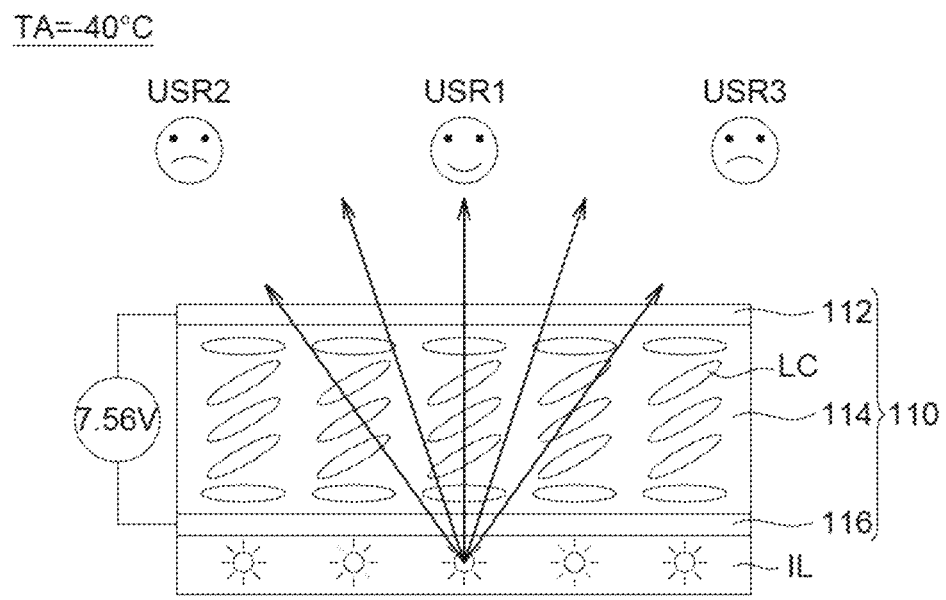
FIG. 7C is a schematic diagram of increasing the driving voltage to enable the anti-peep mode of the anti-peep element to operate normally when the ambient temperature is −40° C. according to an embodiment of the present invention.

FIG. 7A is a schematic diagram of the anti-peep element 110 in the sharing mode when the ambient temperature TA is −40° C. according to an embodiment of the present invention. FIG. 7B is a schematic diagram illustrating the failure of the anti-peep mode of the anti-peep element 110 when the ambient temperature is −40° C. according to an embodiment of the present invention. FIG. 7C shows a schematic diagram of increasing the driving voltage DV to allow the anti-peep mode of the anti-peep element 110 to operate normally when the ambient temperature TA is −40° C. according to an embodiment of the present invention. As shown in FIG. 7A, when the driving voltage DV is 0V, the anti-peep element 110 is in the sharing mode, and the viewers USR1, USR2, and USR3 can see the images. As shown in FIG. 7B, when the driving voltage DV of 4.76V is applied to make the anti-peep element 110 enter the anti-peep mode, the electric field between the first anti-peep electrode layer 112 and the second anti-peep electrode layer 116 cannot drive the liquid crystal molecules LC to rotate normally and enter the anti-peep mode, so that the anti-peep mode of the anti-peep element 110 fails, that is, the viewers USR1, USR2, and USR3 can still see the images. As shown in FIG. 7C, the driving voltage DV is increased to 7.56V, the electric field between the first anti-peep electrode layer 112 and the second anti-peep electrode layer 116 will drive the liquid crystal molecules LC to rotate normally, causing the anti-peep element 110 to enter the anti-peep mode, that is, the viewer USR1 can see the images, but the viewers USR2 and USR3 cannot see the images clearly.

Refer to FIG. 1. The voltage adjustment circuit 130 is electrically connected to the temperature sensor 140 and the driving circuit 120. The temperature sensor 140 is used to sense the ambient temperature, and when the ambient temperature changes, the voltage adjustment circuit 130 correspondingly adjusts the driving voltage DV output by the driving circuit 120. Specifically, the temperature sensor 140 may include a temperature sensing element. When the ambient temperature changes, the characteristics of the temperature sensing element change, and the voltage adjustment circuit 130 dynamically adjusts the value of the driving voltage DV output by the driving circuit 120 according to the ambient temperature measured by the temperature sensor 140 or the change of the characteristics of the temperature sensor 140. For example, the temperature sensing element of the temperature sensor 140 may include a thermistor, and when the temperature changes, the resistance value of the thermistor changes. The thermistor can be a negative temperature coefficient thermistor or a positive temperature coefficient thermistor. In the embodiment where the thermistor is the negative temperature coefficient thermistor, the lower the temperature, the higher the resistance value of the thermistor; and in the embodiment where the thermistor is the positive temperature coefficient thermistor, the lower the temperature, the resistance value of the thermistor is lower. Next, two embodiments will be illustrated to described how the voltage adjustment circuit 130 dynamically adjusts the output value of the driving voltage DV of the driving circuit 120 according to the changes of the characteristics of the temperature sensor 140 corresponding to different ambient temperatures (for example, the changes of resistance values of the temperature sensor 140 corresponding to different ambient temperatures).

Figure 8:
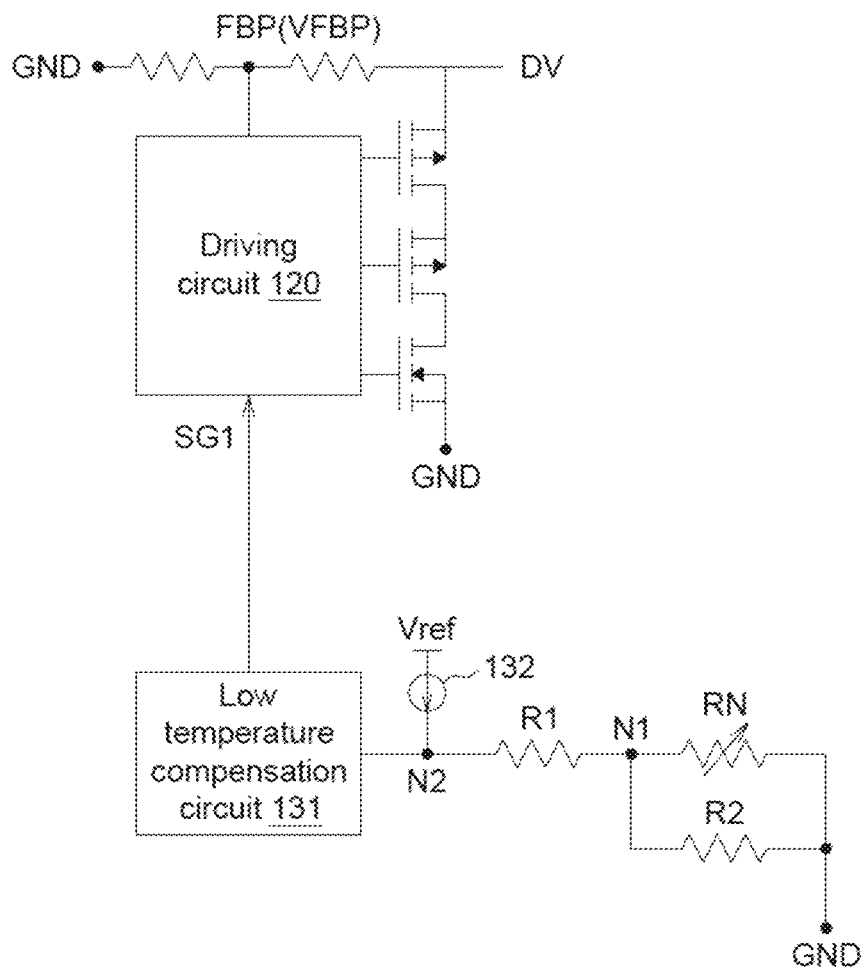
FIG. 8 is a schematic diagram of a driving circuit, a voltage adjustment circuit and a temperature sensor according to an embodiment of the present invention.
Figure 9:
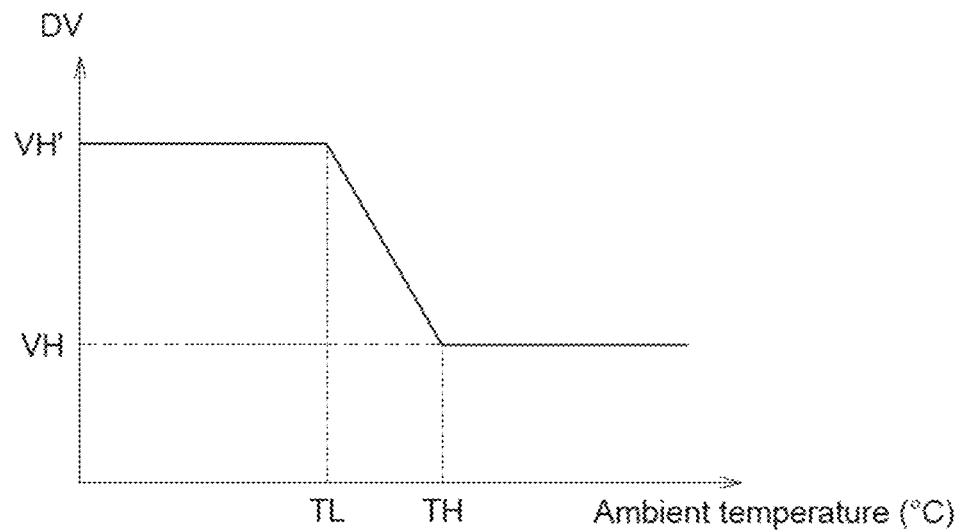
FIG. 9 is a schematic diagram of driving voltages at different temperatures according to an embodiment of the present invention.

FIG. 8 is a schematic diagram of the driving circuit 120, the voltage adjustment circuit 130 and the temperature sensor 140 according to an embodiment of the present invention. FIG. 9 is a schematic diagram of driving voltages at different temperatures according to an embodiment of the present invention. Refer to FIG. 1 and FIG. 8. The voltage adjustment circuit 130 includes a low temperature compensation circuit 131, a current source 132 and two resistors R1 and R2, and the temperature sensor 140 includes a thermistor RN. The thermistor RN is a negative temperature coefficient thermistor. The resistor R2 and the thermistor RN are connected in parallel, two ends of the resistor R2 are coupled to a node N1 and a ground terminal GND respectively, and two ends of the thermistor RN are coupled to the node N1 and the ground terminal GND respectively. Two ends of the resistor R1 are coupled to the node N1 and a node N2 respectively. The current source 132 is coupled to the node N2, so that the current of the current source 132 can flow from a reference voltage Vref to the ground terminal GND via the resistors R1, R2 and the thermistor RN. Since the thermistor RN is a negative temperature coefficient thermistor, when the ambient temperature changes, the resistance value of the thermistor RN will change and the voltage value of the node N2 will change accordingly. The low temperature compensation circuit 131 is coupled to the node N2 and the driving circuit 120, and the low temperature compensation circuit 131 outputs a control signal SG1 to the driving circuit 120. The driving circuit 120 is coupled to a node FBP, and the voltage of the node FBP is a feedback voltage VFBP, which is a divided voltage of the driving voltage DV. In this embodiment, when the temperature decreases, the voltage of node N2 changes. The low temperature compensation circuit 131 can change the control signal SG1 according to the voltage of node N2, and the driving circuit 120 can change the feedback voltage VFBP according to the control signal SG1, thereby adjusting driving voltage DV. Refer to FIG. 9. When the ambient temperature is greater than or equal to TH, the driving voltage DV is VH; and when the ambient temperature is less than or equal to TL, the driving voltage DV is VH', where VH' is greater than VH. For example, the ambient temperature TL can be −40° C., while VH and VH' can be 4.76V and 7.56V respectively.

Figure 10:
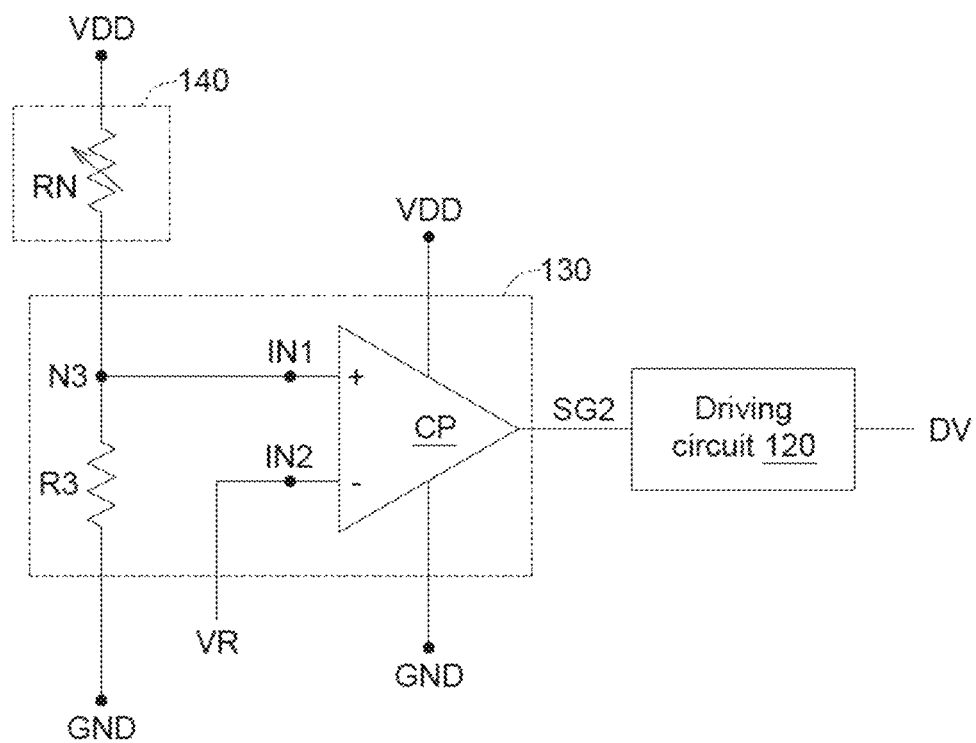
FIG. 10 is a schematic diagram of a driving circuit, a voltage adjustment circuit and a temperature sensor according to another embodiment of the present invention.

FIG. 10 is a schematic diagram of a driving circuit 120, a voltage adjustment circuit 130 and a temperature sensor 140 according to another embodiment of the present invention. Refer to FIG. 1 and FIG. 10. The voltage adjustment circuit 130 includes a comparator CP and a resistor R3, and the temperature sensor 140 includes a thermistor RN. The resistor R3 and the thermistor RN are connected in series. Two ends of the resistor R3 are respectively coupled to a node N3 and the ground terminal GND, and two ends of the thermistor RN are coupled to the node N3 and a high potential terminal VDD respectively. The potential of the high potential terminal VDD is greater than the potential of the ground terminal GND. In the embodiment where the thermistor RN is a positive temperature coefficient thermistor (that is, the lower the temperature, the smaller the resistance of the thermistor RN), when the temperature decreases, the potential of the node N3 will increase; while in an embodiment where the thermistor RN is a negative temperature coefficient thermistor (that is, the lower the temperature, the greater the resistance of the thermistor RN), when the temperature decreases, the potential of the node N3 will decrease. The node N3 is coupled to a first input terminal IN1 of the comparator CP, a second input terminal of the comparator CP receives a reference potential VR, and the comparator CP outputs a control signal SG2. In this embodiment, the first input terminal IN1 is a positive input terminal, and the second input terminal IN2 is a negative input terminal. When the potential of the node N3 is greater than the reference potential VR, the control signal SG2 has a high potential; and when the potential of the node N3 is lower than the reference potential VR, the control signal SG2 has a low potential. The driving circuit 120 receives the control signal SG2 and adjusts the output driving voltage DV according to the potential of the control signal SG2. For example, the driving circuit 120 may be designed to output a first driving voltage when the control signal SG2 has a low potential, and to output a second driving voltage when the control signal SG2 has a high potential, where the absolute value of the second driving voltage is greater than the absolute value of the first driving voltage; or the driving circuit 120 can be designed to output the second driving voltage when the control signal SG2 has a low potential, and to output the first driving voltage when the control signal SG2 has a high potential, where the absolute value of the second driving voltage is greater than the absolute value of the first driving voltage.

For example, in an embodiment where the thermistor RN is the positive temperature coefficient thermistor and the first ambient temperature is greater than the second ambient temperature, when the ambient temperature is the first ambient temperature, the potential of the node N3 can be less than the reference potential VR, the control signal SG2 has a low potential, and the driving circuit 120 outputs the first driving voltage according to the potential of the control signal SG2; when the ambient temperature is the second ambient temperature, the potential of the node N3 can be greater than the reference potential VR, the control signal SG2 has a high potential, and the driving circuit 120 outputs a second driving voltage according to the potential of the control signal SG2, where the absolute value of the second driving voltage is greater than the absolute value of the first driving voltage.

In an embodiment where the thermistor RN is the negative temperature coefficient thermistor, and the first ambient temperature is greater than the second ambient temperature, when the ambient temperature is the first ambient temperature, the potential of the node N3 can be greater than the reference potential VR, the control signal SG2 has a high potential, and the drive circuit 120 outputs the first driving voltage according to the potential of the control signal SG2; when the ambient temperature is the second ambient temperature, the potential of the node N3 can be less than the reference potential VR, the control signal SG2 has a low potential, and the driving circuit 120 outputs a second driving voltage according to the potential of the control signal SG2, where the absolute value of the second driving voltage is greater than the absolute value of the first driving voltage.

In addition, in a modified embodiment, the positions of the resistor R3 and the thermistor RN in FIG. 10 can also be exchanged, that is, two ends of the thermistor RN are respectively coupled to the node N3 and the ground terminal GND, and two ends of the resistance of R3 are respectively coupled to the node N3 and the high potential terminal VDD, which can also change the potential of the node N3 when the ambient temperature changes, thereby changing the potential of the control signal SG2 output by the comparator CP, and the driving voltage DV of the driving circuit 120 changes according to the potential of the control signal SG2.

In the above embodiment and modified embodiment, the ambient temperature at which the driving voltage DV is changed can be determined by adjusting the resistance values of the resistor R3 and the thermistor RN and the potential value of the reference potential VR. For example, the anti-peep module 100 can be designed to increase the driving voltage DV from 4.76V to 7.56V at −40° C. by adjusting the resistance values of the resistor R3 and thermistor RN and the potential value of the reference potential VR.

The anti-peep module and the anti-peep display device including the same of the above embodiments of the present invention can achieve anti-peep effects by changing the viewing angle according to the user's privacy needs in different usage scenarios. In addition, the anti-peep module can improve the anti-peep effect by increasing the driving voltage of the anti-peep element under low temperature operation. Therefore, no matter it is in a normal temperature or low temperature environment, the anti-peep module can exert a normal anti-peeping effect.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An anti-peep module, comprising:
    an anti-peep element comprising a liquid crystal layer, a first anti-peep electrode layer and a second anti-peep electrode layer, wherein the liquid crystal layer is located between the first anti-peep electrode layer and the second anti-peep electrode layer;
    a temperature sensor adapted to sense an ambient temperature, wherein the temperature sensor comprises a thermistor;
    a voltage adjustment circuit coupled to the temperature sensor; and
    a driving circuit coupled to the voltage adjustment circuit and the anti-peep element;
    wherein when the ambient temperature is a first ambient temperature and the anti-peep element operates in an anti-peep mode, the thermistor has a first resistance value, the voltage adjustment circuit outputs a first control signal to the driving circuit according to the first resistance value of the thermistor, the driving circuit outputs a first driving voltage to the anti-peep element according to the first control signal; when the ambient temperature is a second ambient temperature and the anti-peep element operates in the anti-peep mode, the thermistor has a second resistance value, the voltage adjustment circuit outputs a second control signal to the driving circuit according to the second resistance value of the thermistor, the driving circuit outputs a second driving voltage to the anti-peep element according to the second control signal, wherein the first ambient temperature is greater than the second ambient temperature, the first resistance value is different from the second resistance value, the first control signal is different from the second control signal, and an absolute value of the first driving voltage is less than an absolute value of the second driving voltage.

2. The anti-peep module according to claim 1, wherein the first ambient temperature is greater than or equal to 0° C., and the second ambient temperature is less than 0° C.

3. The anti-peep module according to claim 2, wherein the first ambient temperature is in a range of 25° C. to 30° C., and the second ambient temperature is −40° C.

4. The anti-peep module according to claim 1, wherein the absolute value of the second driving voltage is 1.4 to 2 times the absolute value of the first driving voltage.

5. The anti-peep module according to claim 4, wherein the absolute value of the first driving voltage is in a range of 4 to 5V, and the absolute value of the second driving voltage is in a range of 7 to 8V.

6. The anti-peep module according to claim 1, wherein the driving voltage is an AC signal, the driving voltage is a positive value during a part of a period of the AC signal, and the driving voltage is a negative value during a remaining part of the period.

7. The anti-peep module according to claim 1, wherein the anti-peep element further comprises a first alignment layer and a second alignment layer, the first alignment layer is located between the first anti-peep electrode layer and the liquid crystal layer, and the second alignment layer is located between the second anti-peep electrode layer and the liquid crystal layer.

8. An anti-peep display device, comprising:
a display panel; and
the anti-peep module according to claim 1;
wherein the anti-peep element is located on a light incident side or a light-emitting side of the display panel.

9. The anti-peep display device according to claim 8, further comprising a backlight module, wherein the anti-peep element is located between the display panel and the backlight module, or the display panel is located between the backlight module and the anti-peep element.

* * * * *